United States Patent
Mengle et al.

(10) Patent No.: US 9,864,738 B2
(45) Date of Patent: Jan. 9, 2018

(54) METHODS AND APPARATUS RELATED TO AUTOMATICALLY REWRITING STRINGS OF TEXT

(71) Applicant: Google Inc., Mountain View, CA (US)

(72) Inventors: Advay Mengle, Sunnyvale, CA (US); Anna Patterson, Saratoga, CA (US); Ertan Dogrultan, San Francisco, CA (US); James Christopher Davidson, Oakland, CA (US)

(73) Assignee: GOOGLE LLC, Mountain View, CA (US)

( * ) Notice: Subject to any disclaimer, the term of this patent is extended or adjusted under 35 U.S.C. 154(b) by 104 days.

(21) Appl. No.: 14/591,700

(22) Filed: Jan. 7, 2015

(65) Prior Publication Data

US 2016/0062969 A1    Mar. 3, 2016

Related U.S. Application Data

(60) Provisional application No. 62/044,841, filed on Sep. 2, 2014.

(51) Int. Cl.
*G06F 17/27* (2006.01)
*G06F 17/24* (2006.01)
*G06Q 30/02* (2012.01)

(52) U.S. Cl.
CPC .......... *G06F 17/241* (2013.01); *G06F 17/272* (2013.01); *G06F 17/274* (2013.01); *G06F 17/2785* (2013.01); *G06Q 30/0241* (2013.01)

(58) Field of Classification Search
CPC .. G06F 17/2785; G06F 17/271; G06F 17/289; G06F 17/28; G06F 17/273; G06F 17/274; G06F 17/276; G06F 17/277; G06F 17/24; G06F 17/2765; G06F 17/2705; G06F 17/2775; G06F 17/30616; G06F 17/30731;
(Continued)

(56) References Cited

U.S. PATENT DOCUMENTS 5,369,574 A    11/1994  Masegi et al.
6,138,098 A    10/2000  Shieber et al.
(Continued)

FOREIGN PATENT DOCUMENTS

EP    0469884    9/1998
EP    0749074    8/2001
WO    0229622    4/2002

OTHER PUBLICATIONS

International Search Report and Written Opinion of PCT Serial No. PCT/US15/047990 dated Dec. 10, 2015.

*Primary Examiner* — Marivelisse Santiago Cordero
*Assistant Examiner* — Stephen Brinich
(74) *Attorney, Agent, or Firm* — Middleton Reutlinger

(57) ABSTRACT

Methods and apparatus related to automatically rewriting a string of text utilizing one or more rewrite rules. Some implementations are directed to scoring rewrite rules based at least in part on user interactions with rewrites that are generated by applying the rewrite rules. Some implementations are directed to determining the effectiveness of a rewrite generated based on applying one or more rewrite rules to a string of text. In some of those implementations, the determination may be based at least in part on one or more characteristics of the string of text, one or more characteristics of the rewrite, and/or scores associated with the rewrite rules.

25 Claims, 7 Drawing Sheets

(58) Field of Classification Search
CPC ...... G06Q 30/02; G06Q 10/109; G06Q 10/06; G06Q 10/0639; G06Q 30/0241
USPC .............................. 704/1–10, 235, 257, 254
See application file for complete search history.

(56) References Cited

U.S. PATENT DOCUMENTS

| | | | |
|---|---|---|---|
| 2005/0101314 A1* | 5/2005 | Levi | H04L 63/0861 455/423 |
| 2011/0173210 A1* | 7/2011 | Ahn | G06F 17/30616 707/748 |
| 2012/0259620 A1 | 10/2012 | Vratskides et al. | |
| 2013/0144596 A1* | 6/2013 | Lui | G06F 17/2705 704/2 |

* cited by examiner

METHODS AND APPARATUS RELATED TO AUTOMATICALLY REWRITING STRINGS OF TEXT

BACKGROUND

It is often desirable to automatically rewrite a string of text (e.g., a phrase, sentence(s), a paragraph, or other segment of text) to achieve one or more desired objectives. Generally, rewriting a string of text involves converting the string into a rephrased output. For example, a string of text that is a sentence may be rewritten to achieve the objective of sentence compression; and the rephrased output may be a compressed version of the sentence. Various computer-implemented techniques have been utilized to automatically rewrite a textual string. As one example, some techniques relate to the automatic compression of natural language sentences to determine a compressed version of a sentence that is grammatical and/or that preserves certain information from the uncompressed sentence.

SUMMARY

The present disclosure generally pertains to methods and apparatus related to rewriting a string of text utilizing one or more rewrite rules. Some implementations are directed to scoring rewrite rules based at least in part on user interactions with rewrites that are generated by applying the rewrite rules. In some of those implementations, interactions of users with content associated with a rewritten string may be identified, and based on the interactions, a score may be determined for one or more rewrite rules that were utilized to determine the rewritten string. The scores for the rewrite rules may be utilized to determine whether a particular rewrite rule or set of rewrite rules generates effective rewrites. For example, the score for a rewrite rule may be utilized to determine whether the rewrite rule should be applied to future strings of text and/or to determine the effectiveness of future rewrites that are generated based on the rewrite rule. In some implementations, a rewrite rule may be associated with multiple scores that are each associated with one or more characteristics of strings of text. For example, a rewrite rule may have a first score associated with a first set of characteristics of strings of text (e.g., syntactic characteristic(s), semantic characteristic(s), use characteristics) and a distinct second score associated with a second set of characteristics that includes one or more characteristics that are distinct from those of the first set. For instance, a rewrite rule may have a first score that is highly indicative of effectiveness in application of the rewrite rule to strings of text that are associated with an "advertisement" use characteristic; and a second score that is indicative of low effectiveness of applications of the rewrite rule to strings of text that are associated with a "title" use characteristic.

Some implementations are directed to determining the effectiveness of a rewrite generated by applying one or more rewrite rules to a string of text. In some of those implementations, the determination may be based at least in part on one or more characteristics of the string of text, one or more characteristics of the rewrite, and/or scores associated with the rewrite rules. For example, an effectiveness score may be determined for a rewrite by analyzing the rewrite and/or the string of text. The effectiveness score may be indicative of the extent that the rewrite satisfies an objective. The effectiveness score of the rewrite may be utilized, for example, to determine whether to select the rewrite as a valid rewrite. Also, for example, the effectiveness score of the rewrite may additionally and/or alternatively be determined based on previous user interactions with other rewrites generated by the set of rewrite rules utilized to generate the rewrite. For instance, previous user interactions with rewrites generated by the set of rewrite rules may indicate the effectiveness of the set of rewrite rules in generating rewrites for strings of text in general. Also, for instance, previous user interactions with rewrites of strings of text having one or more characteristics may indicate the effectiveness of the set of rewrite rules in generating rewrites for other strings of text with the one or more characteristics.

In some implementations, rewriting a string of text may include generating multiple candidate rewrites of the string of text, determining an effectiveness score for each of the candidate rewrites (e.g., as described in the preceding paragraph), and selecting one or more of the candidate rewrites as valid rewrites based on the score. For example, a first rewrite of a string of text may be generated based on a first set of one or more rewrite rules and a second rewrite of the string may be generated based on a second set of one or more rewrite rules. An effectiveness score may be determined for each of the first and second rewrites, and one or both of the rewrites may be selected as valid rewrites based on the effectiveness scores. For instance, the rewrite associated with the highest effectiveness score that satisfies a threshold may be selected. A valid rewrite may be utilized for various purposes such as, for example, as a substitute for the original string of text in one or more resources and/or as additional content to associate with one or more resources.

In some implementations, one or more characteristics of a string of text may be based on one or more characteristics of the string itself, such as syntactic characteristics of the string (e.g., parts of speech of one or more terms of the string, length of the string), semantic characteristics of the string, etc. In some implementations, one or more characteristics of a string of text may be based on characteristics that are external to the string itself. For example, the string may be identified in a document or other resource and a characteristic of the string may be determined based on other aspects of the resource, such as other strings of text of the resource (e.g., preceding and/or following strings), metadata associated with the resource, a source of the resource, etc. Also, for example, the string may be associated with a particular use (e.g., use in an advertisement, use in a title) and the characteristic may be based on the particular use of the string.

In some implementations, a method is provided that includes: identifying a string of text, wherein the string includes one or more tokens; identifying one or more rewrite rules; identifying a set of the rewrite rules for the string; generating a rewrite of the string based on the tokens and the set of the rewrite rules; providing the rewrite to computing devices for potential interaction by one or more users of the computing devices with content associated with the rewrite; identifying one or more interactions with the rewrite in response to the providing, wherein each of the interactions indicates user interest in the content associated with the rewrite; and scoring the set of the rewrite rules based on the one or more interactions.

This method and other implementations of technology disclosed herein may each optionally include one or more of the following features.

The method may further include: identifying a second set of the rewrite rules for the string; generating a second rewrite of the string based on the tokens and the second set of the rewrite rules; identifying one or more second interactions with the second rewrite in response to providing the second rewrite for potential interaction with content associated with the second rewrite, wherein each of the second interactions indicates user interest in the content associated with the second rewrite; and scoring the second set of the rewrite rules based on the one or more second interactions. The content associated with the rewrite may be the same as the content associated with the second rewrite. In some of those implementations, the rewrite and the second rewrite may be provided as anchor text, and the content may be a webpage linked to by a hyperlink associated with the anchor text. The second set of the rewrite rules may include the rewrite rules of the set of rewrite rules and at least one additional rewrite rule of the rewrite rules.

In some implementations, identifying the set of the rewrite rules may include determining one or more string characteristics for the string and selecting the rewrite rules for inclusion in the set based on the string characteristics.

The method may further include: determining one or more string characteristics for the string; wherein scoring the set of the rewrite rules based on the one or more interactions comprises scoring the set of rewrite rules for the one or more string characteristics.

The method may further include identifying interactions with the string, wherein each of the interactions with the string indicates user interest in content associated with the string, wherein scoring the set of the rewrite rules is further based on the interactions with the string.

The method may further include: identifying a second string of text, wherein the second string includes one or more second string tokens; generating a second rewrite of the second string based on the tokens and the set of the rewrite rules; identifying one or more second interactions with the second rewrite in response to providing the second rewrite for potential computer-based interaction with content associated with the second rewrite, wherein each of the second interactions indicates user interest in the content associated with the second rewrite; and wherein scoring the set of rewrite rules is further based on the one or more second string interactions.

In some implementations, scoring the set of the rewrite rules based on the one or more interactions may include scoring the set of rewrite rules based on comparison of a quantity of the one or more interactions to a quantity of non-interactions of users with the rewrite in response to the providing, wherein each of the non-interactions indicates lack of user interest in the content associated with the rewrite.

In some implementations, identifying the set of the rewrite rules includes selecting the rewrite rules for inclusion in the set based on the rewrite rules preserving sentiment between the string and the rewrite. The rewrite rules of the set may include at least one rewrite rule that replaces one of the tokens with a synonym of the token. The rewrite rules of the set may include at least one rewrite rule that replaces one of the tokens with an antonym of the token. The rewrites rules of the set may include at least one rewrite rule that results in a plurality of rewrites for the string.

In some implementations, identifying the set of the rewrite rules includes selecting the rewrite rules for inclusion in the set based on the rewrite rules minimizing information loss between the string and the rewrite.

In some implementations, identifying the set of the rewrite rules includes selecting the rewrite rules for inclusion in the set based on the rewrite rules minimizing the length of the rewrite. At least one of the rewrite rules of the set may delete one or more of the tokens.

In some implementations, identifying the set of the rewrite rules may include identifying an order of application of the one or more rewrite rules for the set. The set of the rewrite rules may include a first rewrite rule of the rewrite rules and a second rewrite rule of the rewrite rules, wherein the order of application indicates application of the first rewrite rule before application of the second rewrite rule, and wherein generating the rewrite includes: generating an intermediate rewrite of the string based on the tokens and the first rewrite rule; and generating the rewrite of the string based on the intermediate rewrite of the string and the second rewrite rule.

At least one of the rewrite rules of the set may rearrange two or more of the tokens of the string.

In some implementations, generating the rewrite of the string based on the tokens and the set of the rewrite rules includes: identifying a set of the tokens that belong to a subtree of the string; and wherein generating the rewrite is based on the subtree and the set of rewrite rules. In some of those implementations, generating the rewrite of the string based on the tokens and the set of rewrite rules further includes: identifying a second set of the tokens that belong to a second subtree of the string; and wherein generating the rewrite is based on rearranging the subtree and the second subtree.

In some implementations, generating the rewrite may include: generating an intermediate rewrite of the string based on the tokens and a given rewrite rule; and generating the rewrite of the string based on the intermediate rewrite of the string and a second application of the given rewrite rule.

In some implementations, a method is provided that includes: identifying a string of text; identifying a first set of rewrite rules; generating one or more first rewrites based on the first set of rewrite rules and the string of text; identifying a second set of rewrite rules; generating one or more second rewrites based on the second set of rewrite rules; determining effectiveness scores for each of the first rewrites and the second rewrites based on one or more objective functions; selecting a subset of the first and second rewrites based on the effectiveness scores; and providing the subset to one or more computing devices.

This method and other implementations of technology disclosed herein may each optionally include one or more of the following features.

In some implementations, identifying the first set of rewrite rules includes determining one or more string characteristics for the string and selecting the first set of rewrite rules based on the string characteristics.

In some implementations, the first set of rewrite rules includes at least a first rewrite rule and a second rewrite rule, and generating the first rewrites comprises: generating an intermediate rewrite by applying first rewrite rule; and generating a final rewrite of the first rewrites based on applying the second rewrite rule to the intermediate rewrite.

In some implementations, the first set of rewrite rules includes at least a first rewrite rule and the second set of rewrite rules includes the first set of rewrite rules and at least one additional rewrite rule, and generating the one or more second rewrites may be based on the one or more first rewrites. Selecting the subset may include selecting one or more of the first rewrite rules if none of the effectiveness scores of the second set of rewrites satisfies a threshold value.

In some implementations, determining effectiveness scores for each of the first rewrites and the second rewrites based on one or more objective functions comprises: determining effectiveness scores for each of the first rewrites based in part on one or more scores associated with the first set of rewrite rules; and determining effectiveness scores for each of the second rewrites based in part on one or more scores associated with the second set of rewrite rules. The one or more scores associated with the first set of rewrite rules may be based at least in part on past user interactions with past rewrites generated based on the first set of rewrite rules; and wherein the one or more scores associated with the second set of rewrite rules may be based at least in part on additional past user interactions with additional past rewrites generated based on the second set of rewrite rules.

In some implementations, selecting the subset includes selecting only a single rewrite from the first rewrites and the second rewrites. The first set of rewrite rules and the second set of rewrite rules may include at least one shared rewrite rule of the rewrite rules, and wherein selecting the subset includes selecting a given second rewrite of the second rewrite rules to include in the subset only if the effectiveness score of the given second rewrite is more indicative of effectiveness than the first rewrites. The second set of rewrite rules may include the rewrite rules of the first set of rewrite rules and one or more additional rewrite rules. The first set of the rewrite rules and the second set of the rewrite rules may include a first rewrite rule and a second rewrite rule; wherein the order of application of the first set of rewrite rules indicates application of the first rewrite rule before application of the second rewrite rule, and wherein the order of application of the second set of rewrite rules indicates application of the second rewrite rule before the first rewrite rule.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
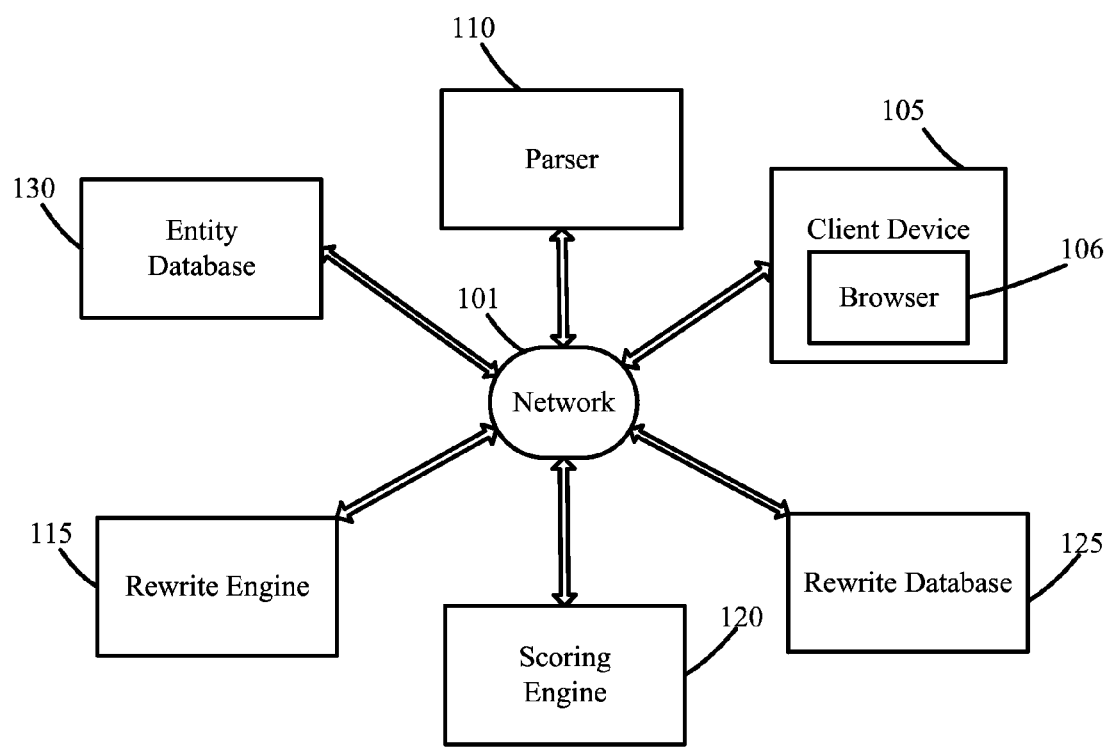
FIG. 1 is a block diagram of an example environment in which one or more rewrites may be generated for a string of text, effectiveness scores for rewrites of the string of text may be determined, and/or rewrite rules utilized in rewriting strings of text may be scored.

A string of text may be identified that includes one or more tokens. Tokens of a string may include, for example, individual characters, individual words, groups of words, and/or other groups of consecutive characters from the string. For example, for the string "Used Car Sale," tokens may include "Used," "Car," "Sale", "Used Car," "Used Car Sale," "Car Sale," etc. In some instances, it may be desirable to rewrite the string to achieve one or more objectives. For example, the string may not conform to one or more constraints and it may be desirable to rewrite the string to meet those constraints. For instance, a string may be anchor text that links to a news story webpage. Due to space limitations, the string may be constrained to a particular character count and it may be desirable to rewrite the sting to conform to the character count. Also, for example, it may be desirable to rewrite a string to summarize the information of the string while minimizing information loss. Also, for example, a string may be associated with content and it may be desirable to rewrite the string in an effort to increase user interest in the content when the rewrite is provided to one or more users in place of the string. As an example, a string may include an advertisement heading and an advertiser may have interest in maximizing the number of viewers that select the advertisement while additionally minimizing loss of information that is included in the string. The string may be rewritten to improve the appeal of the advertisement without significantly changing the meaning.

Generating rewrites of strings of text may include applying a set of one or more rewrite rules to the string of text. In some implementations, a set may include multiple rewrite rules that are consecutively applied to a string (e.g., apply Rule 1 to a string, apply Rule 2 to the string that results from applying Rule 1, etc.). In some implementations, one or more of the rewrite rules of a set may be applied multiple times to a string and/or to one or more intermediate rewrites of a string (e.g., apply Rule 1 to a string to generate an intermediate string, apply Rule 2 to the resulting intermediate string to generate a second intermediate string, apply Rule 1 to the second intermediate string, etc.). In some implementations, a set may include a single rewrite rule. For example, a set may include a single rewrite rule that is applied multiple times to a string (e.g., apply Rule 1 to a string, apply Rule 1 to the results of the first application of Rule 1). Also, for example, a set may include a single rewrite rule that is applied once to a string, with the resulting string as the generated rewrite. In some implementations, the set of rewrite rules may be identified based on the potential effectiveness of the rewrite rules in satisfying one or more desired objectives. For example, one or more rewrite rules may be applied to a string of text to generate rewrites that may be potentially effective in increasing user interest in content associated with the resulting rewrites. The resulting rewrites may be scored based at least in part on one or more objective functions, wherein the resulting score is indicative of effectiveness of the rewrites in satisfying of one or more objectives. For example, an objective may be to generate rewrites that are shorter than the initial string and an objective function may include a comparison of a count of characters in a rewrite to a count of characters in the original string. As one example, one or more sets of rewrite rules may be applied to a given string of text to generate multiple candidate rewrites of the string of text. An effectiveness score for each of the candidate rewrites may be determined based on an objective function that compares the number of characters in the rewrites to the number of characters in the given string (to determine whether the set of rewrite rules effectively results in rewrites that are shorter than the initial string). One or more of the candidate rewrites may be selected as valid rewrites based at least in part on the effectiveness scores. For instance, the rewrite associated with the highest effectiveness score that satisfies a threshold may be selected, the rewrites associated with the top 25% of the effectiveness scores may be selected, etc.

In some implementations, one or more scores associated with the rewrite rules themselves (optionally, a set of rewrite rules may be associated with multiple scores, each for a different string characteristic) may be utilized to select the rewrite rules for application to the string and/or to determine the effectiveness score for the rewrites. For example, as described herein, a set of rewrite rules may be associated with a score based on user interactions (or lack of interactions) with rewrites generated from the set of rewrite rules. For example, based on a count of users that interacted with a rewrite that was provided to the users as an advertisement heading (e.g., a count of those users that selected the advertisement), a score that is indicative of user interest in the advertisement may be determined for the set of rewrite rules utilized to determine the rewrite. In some implementations, the score associated with a set of rewrite rules may be utilized to determine, at least in part, whether to utilize the set of rewrite rules with a future string. For instance, a set of rewrite rules with a score that is indicative of a high number of users interacting with advertisements that include a rewrite may be more likely to be selected as a rewrite rule for future strings that are advertisement headings. In some implementations, the score may be utilized to determine an effectiveness score for one or more rewrites. For example, an effectiveness score for a rewrite generated from a set of rewrite rules may be determined based on a score associated with the set of rewrite rules that is indicative of a high number of users interacting with rewrites generated from the set of rewrite rules. In some implementations, a score for a set of rewrite rules may additionally and/or alternatively be based on effectiveness scores of other rewrites generated based on the set of rewrite rules. For instance, an average or other statistical measure of effectiveness scores of other rewrites generated based on the set of rewrite rules may be utilized to determine a score for the set of rewrite rules. Additional description of determining and utilizing scores associated with rewrite rules is provided below.

FIG. 1 illustrates a block diagram of an example environment in which one or more rewrites may be generated for a string of text, effectiveness scores for rewrites of the string of text may be determined, and/or rewrite rules utilized in rewriting strings of text may be scored. The example environment includes a communication network 101 that facilitates communication between the various components in the environment. In some implementations, the communication network 101 may include the Internet, one or more intranets, and/or one or more bus subsystems. The communication network 101 may optionally utilize one or more standard communications technologies, protocols, and/or inter-process communication techniques. The example environment also includes a client device 105, a parser 110, a rewrite engine 115, a scoring engine 120, a rewrite database 125, and an entity database 130. The client device 105 may execute one or more applications, such as a web browser 106.

Client device 105 may be a computer coupled to one or more components illustrated in FIG. 1 through one or more networks 101 such as a local area network (LAN) or wide area network (WAN) such as the Internet. The client device 105 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. Browser 106 is an application that is executing on client device 105 and may be utilized, for example, to provide one or more webpages to users that may include interactive text, such as hypertext. Rewrites described herein may be presented to users via resources provided to the user via one or more applications executing on computing devices such as client device 105. The browser 106 is one example of an application and webpages are one example of a resource, but these are not meant to be limiting. Other example applications include e-mail applications, personal assistant applications, etc. Other example resources include word processing documents, emails, instant messages, RSS feeds, etc.

Parser 110 may identify one or more strings and parse the strings into one or more tokens. In some implementations, a source may provide parser 110 with a string. For example, a computing device of a user may provide parser 110 with a string that the user has interest in rewriting. In some implementations, parser 110 may identify a string from a resource, such as a document, an advertisement, an email, and/or a webpage. For example, parser 110 may identify and/or be provided with a document that is a news story; and parser 110 may identify the headline of the document as a string that may be rewritten utilizing one or more rewrite rules.

In some implementations, pre-processing of a string may be performed by the parser 110 and/or a string may be provided to the parser 110 that has been pre-processed by another component. For example, a string of "ADOPT PUPPIES TODAY" may be pre-processed to "adopt puppies today," by parser 110 (i.e., replace uppercase letters with corresponding lowercase letters). Also, for example, a component may provide pre-process "ADOPT PUPPIES NOW" to "adopt puppies now" and provide the pre-processed string to parser 110. In some implementations, rewrites that are determined from a pre-processed string may be post-processed by an inverse of the pre-processing. For example, a string may be pre-processed by replacing all uppercase letters to lowercase letters, and determined rewrites may have all lowercase letters replaced by uppercase letters to transform the formatting of the rewrites to match the formatting of the original string.

In some implementations, parser 110 may identify a string based on one or more characteristics of a document that includes the string. For example, parser 110 may identify a string as a title of a document based on the string occurring at the beginning of the document, based on formatting of the string within the document (e.g., XML or HTML tags applied to the string), and/or otherwise based on one or more aspects external to the terms of the string. In some implementations, parser 110 may identify a string from a plurality of strings based on one or more terms of the identified string. For example, parser 110 may identify one or more terms that are important keywords in a document and select a string that includes the keywords (e.g. "Breaking News" in a document that is a news story).

In some implementations, parser 110 may tokenize a string based on one or more terms of the string. Tokenizing a string may include, for example, separating the string into one or more words and/or phrases. For example, parser 110 may identify a string of "Buy Product today" and may tokenize the string into words (i.e., tokens of "Buy," "Product," and "today") and/or one or more phrases (e.g., "Buy Product"). In some implementations, punctuation may be utilized to tokenize a string. For example, a string of text may include multiple sentences separated by periods and/or multiple phrases separated by commas, and parser 110 may identify each sentence and/or phrase as a token.

In some implementations, parser 110 may be configured to annotate string of text and/or its constituent tokens with one or more characteristics. In some implementations, the characteristics include formatting characteristics, source characteristics, use characteristics, and/or grammatical characteristics (e.g., syntactic and/or semantic). For example, parser 110 may be configured to identify and annotate various types of grammatical characteristics in one or more strings of text. For example, parser 110 may include a part of speech tagger configured to annotate each token of a string of text with a part of speech such as "noun," "adjective," "pronoun", "prepositional phrase," and/or "conjunction." As an example, parser 110 may tokenize a string of "Buy Product Today!" and identify a token of "Buy." Parser 110 may identify the term "buy" in a database (e.g., entity database 130) and identify that the term is a verb. Also, for example, in some implementations the parser 110 may additionally and/or alternatively include a dependency parser configured to determine syntactic relationships between tokens in one or more strings of text. For example, the dependency parser may determine which tokens modify other tokens, subjects and verbs of sentences, and so forth (e.g., a parse tree)—and may make annotations of such dependencies.

Also, for example, in some implementations, parser 110 may additionally and/or alternatively include an entity tagger configured to annotate entity references in one or more segments such as references to people, organizations, locations, and so forth. For example, the entity tagger may annotate all references to a given person in a string of text. The entity tagger may annotate references to an entity at a high level of granularity (e.g., to enable identification of all references to an entity type, such as "people") and/or a lower level of granularity (e.g., to enable identification of all references to a particular entity, such as a particular person). The entity tagger may rely on content of the document to resolve a particular entity and/or may optionally communicate with entity database 130 or other database to resolve a particular entity.

Also, for example, parser 110 may identify a string from a webpage or other resource and annotate the string with indications of formatting of the string in the resource (e.g., one or more terms appear in the resource with a bold format). For example, parser 110 may identify one or more HTML or XML tags associated with the string and annotate the strings and/or text with such information. Also, for example, a string of text may be identified from a resource and the string of text may be annotated with a domain name, author, category, and/or other information associated with the resource. For instance, for a string of text extracted from a webpage that hosts a news story, the string of text may be annotated with the domain name of the webpage and a "news" category.

In some implementations, parser 110 may annotate a string with a characteristic that is indicative of a use of the string, such as "advertisement," "news headline," and/or other indication of how the string may be utilized by one or more applications. In some implementations, a string use may be identified based on one or more terms in the string. For example, a string may include "Buy" and parser 110 may determine that the string is an advertisement. In some implementations, other characteristics of a resource that includes the string may be utilized to determine a string use. For example, a string that is provided by a news service may be identified as having a "news headline" use characteristic. In some implementations, a use characteristic of a string may be determined based on a source and/or provide of the string. For example, an advertising service may provide a string for rewriting and an "advertisement" use characteristic may be determined for the string based on it being provided by the advertising service.

In some implementations, a characteristic of a string may be an objective for the string. For example, a string may be associated with an objective of "limit to 64 characters." In some implementations, the objective of a string may be determined based on a use characteristic that is associated with the string. For example, strings with a "news headline" use characteristic may be associated with an objective of "limit to five words."

In some implementations, a characteristic of a string may be determined based on one or more other strings associated with the string. For example, a string may be identified from a document and one or more other terms and/or other strings in the document may be utilized to determine a characteristic of the string. In some implementations, other indications of a document may be utilized to determine characteristics of a string. For example, formatting of a string within a document, typeface of the string, HTML tags associated with a string, and/or other metadata may be utilized to determine one or more characteristics of a string.

In some implementations, a characteristic of a string may be determined based at least in part on the source of the string. For example, a string may be identified as a headline in a webpage from a news source, and a use of "news headline" may be determined for the string based on identifying a rule that indicates webpages associated with a news source likely include strings that are headlines. Also, for example, a source of a string, such as domain for a webpage that includes the string, and one or more other characteristics of the string (e.g., formatting of the string, location of the string in the document, metadata associated with the string) may be utilized to determine a characteristic for the string.

Parser 110 may provide rewrite engine 115 with a tokenized string and one or more characteristics for the tokenized string, and rewrite engine 115 may identify one or more rewrite rules to apply to the string. In some implementations, rewrite engine 115 may identify one or more rewrite rules via rewrite database 125. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently.

Examples of rewrite rules that may be included in rewrite database 125 are provided below:

Delete adjectives. One or more tokens of a string that have been identified by parser 110 as adjectives may be removed from the string to generate a rewrite. For example, a string of "Buy New Product Today" may be rewritten as "Buy Product Today."

Remove prepositional phrases. One or more tokens that have been identified by parser 110 as prepositional phrases may be removed from a string to generate a rewrite. For example, a string of "Buy product from Store 1" may have "from Store 1" removed to generate a rewrite of "Buy product."

Remove an entire sentence. In some instances, a string may include multiple sentences that are delineated by one or more indications, such as punctuation, spacing, paragraph breaks, and/or capitalization of terms in the string. A rewrite may be generated by removing one or more sentences of a multi-sentence string.

Delete delimiters. In some instances, delimiters, such as stop words may be removed from a string. For example, conjunctions, possessives, and/or articles may be removed from a string to generate a rewrite.

Replace token with synonym. In some instances, one or more tokens may be replaced with a token that has the same or a similar meaning. For example, a string of "Buy Great Cars Here" may be rewritten as "Buy Excellent Cars Here." One or more synonyms for a token may be identified from one or more databases, such as entity database 130. Also, for example, a phrase may be replaced with one or more tokens that result in a synonym of the phrase. For instance, a string may include the tokens "not happy" and a rewrite rule may replace "not happy" with "sad" and/or "mad."

Produce multiple rewrites for conjunctive elements. In some instances, a conjunction may be present in a string and two or more rewrites may be generated that alternatively use two or more terms separated by a conjunction. For example, a string of "Adopt puppies and kittens" may be rewritten as two rewrites: "Adopt puppies" and "Adopt kittens."

Produce multiple rewrites by rearranging one or more elements. For example, a conjunction may be present in a string and two or more rewrites may be generated that rearrange the order of the elements of a conjunctive phrase. For example, for a string of text of "A and B and C," rewrites may be generated that include "B and A and C," "A and C and B," etc. In the immediately preceding example, "A," "B," and/or "C" may each be a single term or a set of terms (e.g., a set of terms that are all part of the same subtree of a string).

Chunking. In some instances, a set of tokens of a string may be extracted as a rewrite if the set of tokens meets one or more conditions. Chunks may be identified from a string, wherein a chunk is two or more consecutive tokens of the string. For example, a condition for a rewrite may be that the rewrite includes a noun and a verb. Chunks may be identified from the string and chunks that include both a noun and a verb may be provided as rewrites. Also, for example, two consecutive tokens may be combined into a chunk and additional consecutive tokens may be added to the chunk until the chunk meets the one or more conditions. The resulting chunk may then be provided as a rewrite.

The preceding list is not exhaustive of possible rewrite rules, but is merely a set of example rewrite rules. Other rewrite rules may be utilized that rewrite a string by rearranging one or more of the tokens, deleting one or more of the tokens, and/or adding one or more tokens.

In some implementations, one or more rewrite rules may be applied to tokens of a string to generate rewrites of the string. For example, a string of "Buy a new car today" may have a rewrite rule applied that results in a generated rewrite of "Buy a new vehicle today." Also, for example, one or more rewrite rules may rearrange one or more phrases of a string and/or replace one or more phrases with a different token and/or phrase. For example, a string of "I went to the store, then had dinner" may have rewrite rules applied that results in a generated rewrite of "Before having supper, I went to the store."

In some implementations, rewrite engine 115 may identify a set of rewrite rules to apply to a string. For example, rewrite engine 115 may identify one or more rewrite rules via rewrite database 125. In some implementations, rewrite engine 115 may identify a set of multiple rewrite rules to apply to a string. For example, rewrite engine 115 may identify a rewrite rule of "Remove adjectives" and additionally identify a rewrite rule of "Produce multiple rewrites for conjunctive elements." The identified rewrite rules of a set may be applied iteratively to the string. In some implementations, a specific order of application of the rewrite rules may be determined by rewrite engine 115. For example, rewrite engine 115 may identify a set of rewrite rules that includes Rule 1 and Rule 2 and that further specifies to apply Rule 1 to the string to generate an intermediate rewrite and then apply Rule 2 to the intermediate rewrite to generate the final rewrite for the string. In some implementations, the specific order of application of the rewrite rules may include application of one or more of the rewrite rules multiple times. For example, rewrite engine 115 may identify a set of rewrite rules that includes Rule 1 and Rule 2 and that further specifies to apply Rule 1 to the string to generate a first intermediate rewrite, apply Rule 1 to the first intermediate rewrite to generate a second intermediate rewrite, apply Rule 2 to the second intermediate rewrite to generate a third intermediate rewrite, and apply Rule 1 to the third intermediate rewrite to generate the final rewrite of the string.

In some implementations, rewrite engine 115 may select a set of rewrite rules for a string based on one or more characteristics of the string and one or more characteristics associated with one or more of the rewrite rules. For example, a string may be associated with a use characteristic of "advertisement" and rewrite engine 115 may identify one or more rewrite rules that have been identified as generating effective rewrites for strings with an "advertisement" use characteristic. In some implementations, characteristics may be associated with one or more rewrite rules based on one or more of the techniques described herein. For example, one or more strings with a particular characteristic may be provided to rewrite engine 115 and scores for the generated rewrites may be utilized to determine a score for the rewrite rule that is specific to strings with the particular characteristic.

In some implementations, rewrite engine 115 may identify multiple sets of rewrite rules to apply to a string and determine an effective rewrite based on one or more effectiveness scores of the resulting rewrites. For example, referring to FIG. 2, a diagram of example potential sets of rewrite rules and rewrites generated based on iterative application of the rewrite rules is provided. In the illustrated example, three potential sets of rewrite rules are identified. Rewrite engine 115 may apply Rule 1 alone (i.e., a set that includes only one rewrite rule) and rewrite R1 may be generated based on the rewrite rule. Additionally or alternatively, rewrite engine 115 may identify a set that includes Rule 1 and Rule 2, wherein Rule 1 is first applied to a string, followed by application of Rule 2, to generate rewrite R2. Additionally or alternatively, rewrite engine 115 may identify a set of rewrite rules that includes application of Rule 1 and then Rule 3, resulting in rewrite R3. Additional and/or alternative rewrite rules may be applied. For example, Rule 1, Rule 2, and/or Rule 3 may be applied in a different order (e.g., Rule 3 followed by Rule 1), in combination with additional rewrite rules (e.g., Rule 1, followed by Rule 2, followed by Rule 4), Rule 2 and/or Rule 3 may be applied separately (e.g., Rule 2 alone and Rule 3 alone), and/or all three rules may be consecutively applied to a string to generate a rewrite (e.g., Rule 1, followed by Rule 2, then followed by Rule 3).

In some implementations, rewrite engine 115 may utilize one or more objective functions to determine effectiveness scores for each of the resulting rewrites. For example, rewrite engine 115 may utilize any of one or more objective functions that generally indicate the effectiveness of a rewrite in satisfying an objective. Objective functions may include:

Rewrite cost. A rewrite cost may be determined for a rewrite that indicates how different it causes the rewrite to be from the string. In some implementations, the rewrite cost may be dependent on rewrite rules cost(s) that have been assigned to the rewrite rule(s) utilized to generate the string. For example, a set of rewrite rules may include Rule 1 and rewrite Rule 2 may be applied to generate a rewrite and each may be associated with a respective rewrite rule cost. A rewrite of a string may be generated by application of Rule 1 and Rule 2 to the string, and the rewrite cost of the generated rewrite may be determined based on a sum, average, or other statistical measure of the Rule 1 and Rule 2 rewrite rule costs. In some implementations, the rewrite rules costs may be manually assigned to the rewrite rules. In some implementations, a low rewrite cost indicates little difference between the string and the rewrite and a low rewrite cost may result in the effectiveness score being more indicative of effectiveness of the rewrite than a high rewrite cost.

Edit distance. An edit distance may be determined between a rewrite and the string. Various distance measures may be utilized such as a Damerau-Levenshtein distance between the rewrite and the string. For some rewrite objectives, a small edit distance indicates little difference between the string and the rewrite and a small edit distance may result in the effectiveness score being more indicative of effectiveness of the rewrite than a large edit distance. For some other rewrite objectives, a large edit distance may result in the effectiveness score being more indicative of effectiveness of the rewrite than a small edit distance.

Text Length. The text length may take into account a count of the characters and/or tokens in a rewrite and/or a count of the characters and/or token in the string. For example, a text length objective function may provide a count of the characters of a rewrite, provide a binary result indicating whether the count of characters of a given rewrite satisfies a threshold character count (e.g., is less than a threshold or is greater than a threshold), and/or provide a result that indicates a text length difference between the rewrite and the string. Depending on the objective of the rewrite, longer rewrites or shorter rewrites may be favored. For example, for an objective of compression of a string, shorter rewrites are favored and a shorter rewrite will result in an effectiveness score being more indicative of effectiveness than a longer rewrite.

Text Similarity. Text similarity of a rewrite may be determined based on comparison of one or more of the tokens of the string to one or more of the tokens of the rewrite. For example, a text similarity objective function may determine a semantic similarity measure between the string and the rewrite. Also, for example, a text similarity objective function may compare an embedding of tokens of the rewrite to an embedding of the tokens of the string. For instance, the embeddings may be in an embedded space where distance measures between tokens indicate the similarity between the tokens. In some implementations, text similarity that is indicative of a high degree of similarity may result in the effectiveness score being more indicative of effectiveness of the rewrite than text similarity that is indicative of a low degree of similarity.

Parts of speech. Determines a count of occurrences of one or more parts of speech in the rewrite. For example, may determine the count of occurrences of verbs, adjectives, nouns, etc. in the rewrite. In some implementations, occurrence of a part of speech in a rewrite may result in the effectiveness score being more indicative of effectiveness of the rewrite than if the part of speech failed to occur in the rewrite. For instance, occurrence of a verb in a rewrite may result in an effectiveness score that is more indicative of effectiveness than if the verb failed to occur in the rewrite.

Any combination of one or more objective functions. For example, a linear combination of one or more of the preceding objective functions and/or additional or alternative objective functions may be utilized in determining an effectiveness score.

Figure 2:
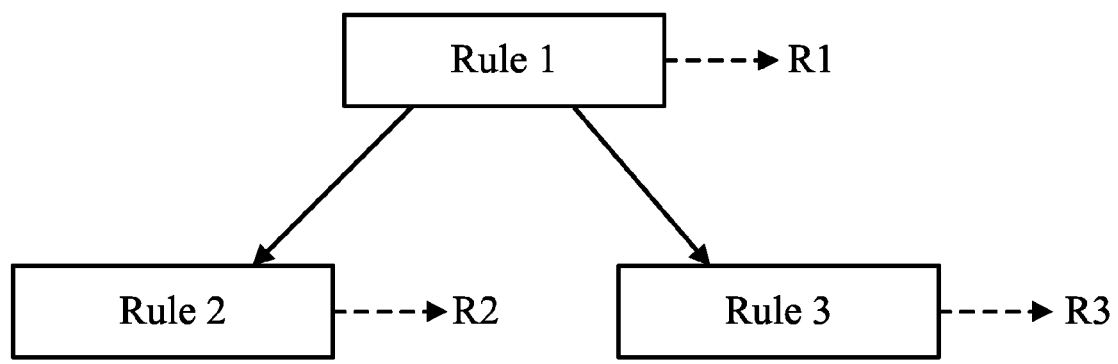
FIG. 2 is a diagram of example potential sets of rewrite rules and rewrites generated based on iterative application of the rewrite rules.

As an example, referring to FIG. 2, for each of R1, R2, and R3, an objective function may be utilized to determine an effectiveness score for each of the rewrites, and one or more of the rewrites may be provided to one or more users based on the effectiveness score. In some implementations, scores of the rewrites may be compared to each other to determine whether to provide one or more of the rewrites. For example, one or more rewrites with highest effectiveness scores may be provided, a percentage of rewrites with the highest scores may be provided, and/or other rewrites that meet a threshold may be provided to one or more users. In some implementations, rewrite engine 115 may provide all rewrites generated from one or more sets of rewrite rules to one or more users.

Figure 3A:
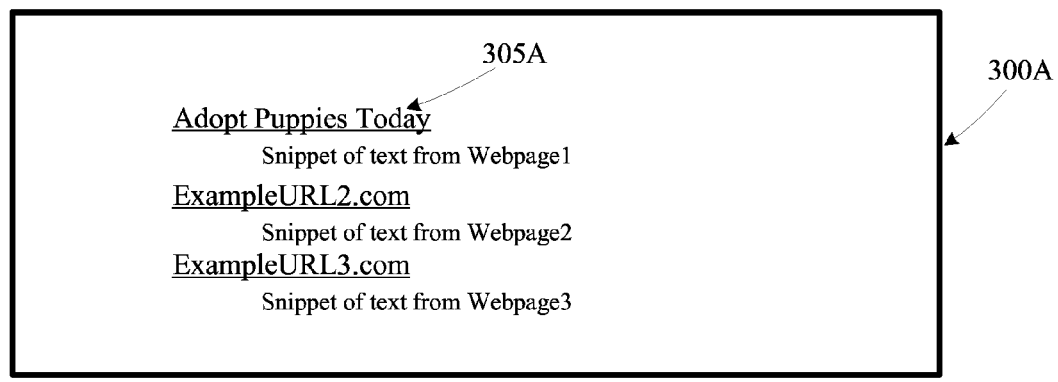
FIG. 3A is an illustration of a sample document that includes a rewrite of a string of text.
Figure 3B:
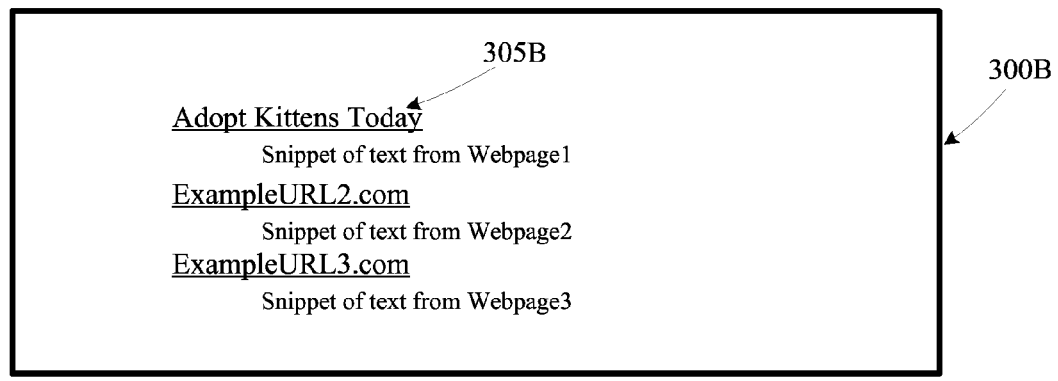
FIG. 3B is another illustration of the sample document that includes a second rewrite of the string of text.

Rewrite engine 115 provides one or more rewrites of a string (e.g., those having effectiveness scores that satisfy a threshold) to one or more users for potential interaction. Interactions may include, for example, a user selecting a link that includes the rewrite as anchor text, hovering with a mouse over a location that includes a display of the rewrite text, and/or other indications of user interest in the provided rewrite. In some implementations, one set of users may be provided with a first rewrite of the string and a second set of users may be provided with a second rewrite of the string. For example, referring to FIG. 3A and FIG. 3B, two webpages are illustrated that may be provided to users. Webpage 300A includes link 305A, which includes anchor text of "Adopt puppies today" and webpage 300B includes link 305B, which includes anchor text of "Adopt kittens today." The anchor texts of link 305A and link 305B may be rewrites that are generated based on one or more rewrite rules. For example, rewrite engine 115 may identify a rewrite rule of "Produce multiple rewrites for conjunctive elements" for a string of "Adopt puppies and kittens today" based on identifying that the string includes a token that was identified by parser 110 as a conjunction. Rewrite engine 115 may provide webpage 300A that includes a first rewrite of "Adopt puppies today" to a first group of users and provide a second group of users with webpage 300B that includes a second rewrite of the string, "Adopt kittens today." Webpage 300A and webpage 300B may be provided to one or more users via a browser executing on a client device, such as browser 106 executing on client device 105.

Scoring engine 120 may identify one or more interactions of users with one or more provided rewrites of a string and determine a score for the set of rewrite rules that were utilized to determine the rewrites. For example, referring to FIGS. 3A and 3B, webpage 300A may be provided to 1,000 users and webpage 300B may be provided to a second group of 1,000 users, and scoring engine 120 may determine a count of users that selected link 305A and a count of users that selected link 305B. In some implementations, a score may be determined for the rewrite rule of "produce multiple rewrites for conjunctive elements" based on the count of users. For example, an overall rewrite rule score may be determined based on the total number of users that clicked on one of the rewrites (i.e., a general rewrite rule score). Also, for example, a score may be determined based on the counts of users that interacted with each of the rewrites individually and/or a comparison between the number of users that interacted with each of the rewrites and a separate score may be determined for each of the rewrites (i.e., specific scores for the rewrites themselves).

In some implementations, a first group of users may be provided with a rewrite that was generated from a first set of rewrite rules, a second group of users may be provided with a rewrite that was generated from a second set of rewrite rules, and scores for each of the sets of rewrite rules may be determined based on a count of users that selected each of the rewrites. For example, anchor text of link 305A may be generated utilizing Rule 1 and anchor text of link 305B may be generated utilizing Rule 2, and webpage 300A may be provided to a first group of users and webpage 300B may be provided to a second group of users. Scoring engine 120 may determine counts of user interactions with each of the rewrites and scores may be determined for Rule 1 and Rule 2 based on the counts. Alternatively or additionally, other techniques may be utilized by scoring engine 120 to determine scores for one or more sets of rewrite rules. For example, scoring engine 120 may identify the amount of time that users interact with content associated with one of the rewrites (e.g., the residence time on a webpage linked to by link 305A), the time between the user being provided a rewrite and the user interacting with the rewrite, and/or other indications of potential user interest in content associated with a rewrite.

In some implementations, one or more users may be provided with the original string instead of a rewrite of the string. For example, a first group of users may be provided with a webpage that includes the string as anchor text for a link and a second group of users may be provided with a webpage that includes a rewrite of the string as anchor text for a link. Scoring engine 120 may determine a score for the rewrite rule that was utilized to generate the rewrite based on a comparison between interactions of users with the original string and interactions of users with the rewrite. For example, scoring engine 120 may determine a score for a set of rewrite rules that is indicative of a difference of user interactions with the rewrite versus the original string. For instance, a score may be indicative of effectiveness of the set of rewrite rules when there is a greater rate of user interaction with the rewrite than with the original string. On the other hand, a score may not be indicative of effectiveness of the set of rewrite rules when there is a lesser rate of user interaction with the rewrite than with the original string.

In some implementations, one or more of the rewrites may be associated with content and interactions of users with the content may be indicative of user interest in the rewrite. For example, a string that is a news headline may be associated with a news story and a rewrite may be generated for the string. Based on identifying that more users selected the rewrite than the string and/or based on identifying that users who selected the rewrite viewed the associated news story for a longer period of time, scoring engine 120 may determine a score for the set of rewrite rules that generated the rewrite that is indicative of effectiveness of the rewrite rules to increase user interactions.

In some implementations, scoring engine 120 may determine multiple scores for a set of rewrite rules that are each associated with one or more characteristics of strings. For example, scoring engine 120 may utilize Rule 1 for multiple strings with multiple characteristics. For each string, scoring engine 120 may determine a score. Scoring engine 120 may subsequently identify that rewrites of strings with a first characteristic, such as "news headlines," tend to have better scores than rewrites of strings with a second characteristic, such as "advertisements." Scoring engine 120 may determine a first score for Rule 1 that is associated with strings with a "news headlines" characteristic and that is more indicative of effectiveness of the rewrite rules than a second score for strings with an "advertisements" characteristic.

In some implementations, parser 110 may determine one or more characteristics of a string and the characteristics may be utilized to select one or more rewrite rules that are effective for strings with the identified characteristics. For example, parser 110 may identify that a string includes a conjunction. Rewrite engine 115 may identify a set of rewrite rules with a score that is indicative of effectiveness of the set with strings that include conjunctions. Also, for example, rewrite engine 115 may identify a string that includes less than a threshold number of tokens and may not select a set of rewrite rules with a score that is indicative of effectiveness in generating rewrites that include a number of tokens that is greater than the threshold.

Figure 4:
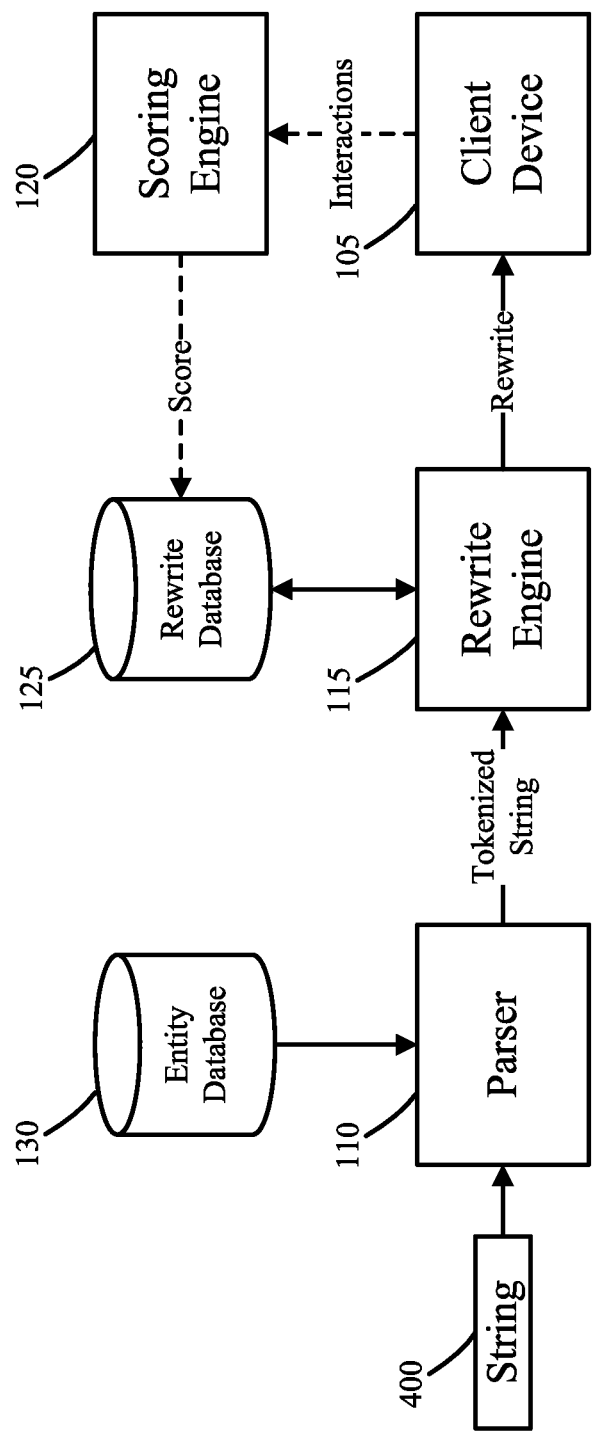
FIG. 4 is a flowchart illustrating an example process of identifying a set of rewrite rules and applying the set of rewrite rules to a string of text.

Referring to FIG. 4, a flowchart is provided that illustrates an example process of identifying a set of rewrite rules and applying the set of rewrite rules to a string. In the flowchart, dotted lines denote additional processes that may optionally be performed. Additionally, although FIG. 4 is provided with respect to determining one or more rewrites of a single string, the same steps may be performed utilizing multiple strings. For example, the same steps may be utilized for a plurality of strings and the resulting scores may be utilized to determine a score for a set of rewrite rules.

String 400 may be identified by parser 110. Parser 110 tokenizes string 400 into one or more tokens and may annotate one or more of the tokens with one or more characteristics of the string 400 and/or its constituent tokens. For example, parser 110 may include a part of speech tagger configured to annotate each token of the string 400 with a part of speech, a dependency parser configured to annotate syntactic relationships between tokens in the string 400, and/or an entity tagger configured to annotate entity references in the string 400.

Parser 110 provides the tokenized string to rewrite engine 115. Rewrite engine 115 may identify a set of rewrite rules from rewrite database 125 and generate one or more rewrites utilizing the set of rewrite rules. In some implementations, rewrite engine 115 may identify rewrite rules of the set based on, for example, one or more characteristics of the string 400 and/or tokens of the string 400, one or more objectives for rewrites of the string 400, and/or a score associated with one or more of the rewrite rules. In some implementations, rewrite engine 115 may identify multiple sets of rewrite rules and generate multiple candidate rewrites based on the multiple set of rewrite rules.

Rewrite engine 115 generates one or more rewrites based on the identified set or sets of rewrite rules and provides one or more of the rewrites to client device(s) 105. In some implementations the rewrite engine 115 may provide the one or more rewrites to another system which, in turn, provides one or more of the rewrites to client device(s) 105. For example, the rewrite engine 115 may provide a rewrite to an ad server which may incorporate the rewrite into an advertisement and provide the advertisement to multiple client devices 105. In some implementations, rewrite engine 115 may determine an effectiveness score for each of the generated rewrites and select one or more of the rewrites to provide based on the effectiveness scores. For example, rewrite engine 115 may utilize an objective function, as described herein, to score each of the rewrites and provide one or more of the rewrites to client device 105 based on the effectiveness scores. In some implementations, the sets of rewrite rules that were utilized to generate the rewrites may each be associated with a score (e.g., previous effectiveness scores of one or more rewrites, previous scoring based on user interactions with rewrites generated by the rewrite rules), and determining the effectiveness scores may be based at least in part on the score associated with the rewrite rules. For example, the effectiveness score for a given rewrite determined based on a set of rewrite rules may be based on one or more objective functions and based on a score associated with the set of rewrite rules (e.g., based on pervious user interactions with other rewrites generated based on the set of rewrite rules).

In some implementations, rewrite engine 115 may identify multiple sets of rewrite rules and determine an effectiveness score after each application. For example, rewrite engine 115 may identify Rule 1 as a rewrite rule for string 400, apply Rule 1 to string 400, generate R1, and determine an effectiveness score E1 for R1. If E1 is indicative of effectiveness of R1, rewrite engine 115 may identify Rule 2 and apply Rule 2 to R1 to generate R2. Rewrite engine 115 may determine an effectiveness score E2 for R2 and if E2 is indicative of effectiveness, identify one or more other rules to apply to R2. Alternatively, if E2 is indicative of ineffectiveness of R1, rewrite engine 115 may provide R1 (i.e., the last rewrite in the chain of rewrites with an effectiveness score indicative of effectiveness) as a rewrite of string 400.

As described, one or more of the rewrites are provided to client device(s) 105 for potential interaction with the rewrites by one or more users. Client device(s) 105 may each provide indications of interactions of users with the one or more rewrites to scoring engine 120. Based on the user interactions, scoring engine 120 may determine a score for the set of rewrite rules that were utilized to generate the provided one or more rewrites. In some implementations, scoring engine 120 may store the determined score with the set of rewrite rules in rewrite database 125 for later utilization by rewrite engine 115 in determining an effectiveness score for a subsequent rewrite. In some implementations, rewrite engine 115 may determine one or more rewrites, store the one or more rewrites in rewrite database 125, and provide the rewrite(s) to one or more client devices 105 at a later time. For example, rewrite engine 115 may include a serving engine that identified previously determined rewrites in rewrite database 125 and includes the rewrites in content provided to the computing device 105.

In some implementations, the illustrated flowchart of FIG. 4 may be utilized for multiple strings and the resulting rewrites may be utilized to determine one or more scores to associate with a set of rewrite rules. For example, multiple strings may be parsed by parser 110, and rewrite engine 115 may identify a set of rewrite rules in rewrite database 125. Rewrite engine 115 may generate rewrites for each of the tokenized strings and an effectiveness score may be determined for each of the rewrites based on one or more objective functions. The resulting effectiveness scores may be utilized to determine an effectiveness score for the set of rewrite rules and the effectiveness score may be stored in rewrite database 125 for later use by rewrite engine 115 in generating rewrites for a future string. In some implementations, rewrite engine 115 may determine that the set of rewrite rules is ineffective based on the effectiveness scores of the rewrites, and rewrite engine 115 may remove the set of rewrite rules from rewrite database 125. In some implementations, multiple strings may be scored by rewrite engine 115, provided to client device 105, and interactions that are provided to scoring engine 120 may be utilized to determine a score for the set of rewrite rules. The score may be stored in rewrite database 125. In some implementations, the score determined by scoring engine 120 may be utilized by rewrite engine 115 to determine an effectiveness score for one or more rewrites and/or one or more sets of rewrite rules.

In some implementations, multiple strings may be provided to parser 110 and the characteristics of the provided strings may be identified and utilized to determine one or more characteristic-specific scores for a set of rewrite rules. For example, 500 newspaper headlines may be provided to parser 110 and rewrite engine 115 may generate rewrites for the headlines and determine effectiveness scores for the rewrites. The effectiveness score may be utilized to determine a score for the set of rewrite rules that is specific to strings that are newspaper headlines. If the resulting score is indicative of effectiveness in rewriting newspaper headlines, rewrite engine 115 may later identify the set of rewrite rules for a string that is a newspaper headline based on the "newspaper headline"-specific score.

Figure 5:
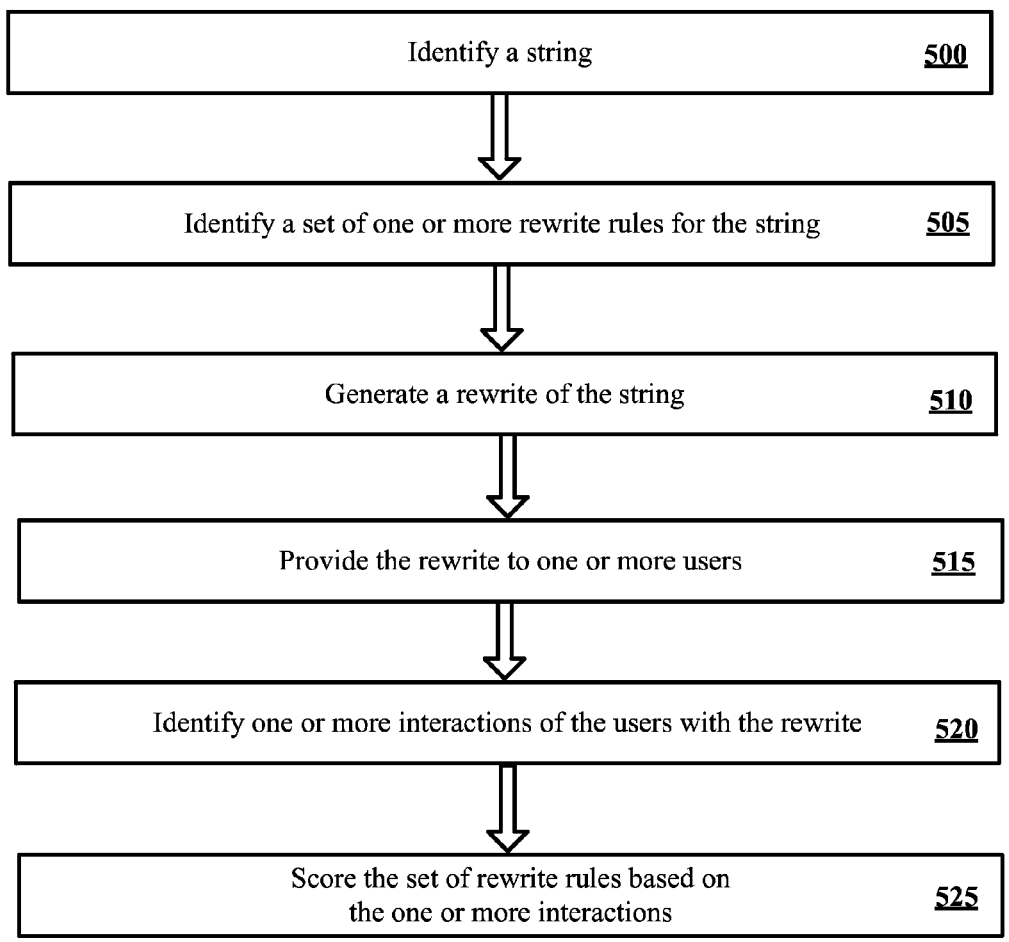
FIG. 5 is a flowchart illustrating an example method of determining a score for a set of rewrite rules based on interactions of users with rewrites generated from the rewrite rules of the set.

Referring to FIG. 5, a flowchart illustrating an example method of determining a score for a set of rewrite rules based on interactions of users with rewrites generated from the rewrite rules of the set is provided. Other implementations may perform the steps in a different order, omit certain steps, and/or perform different and/or additional steps than those illustrated in FIG. 5. For convenience, aspects of FIG. 5 will be described with reference to one or more components of FIG. 1 that may perform the method, such as rewrite engine 115 and/or scoring engine 120.

The string may be identified by a component that shares one or more characteristics with parser 110. In some implementations, parser 110 may be configured to identify and annotate various types of characteristics for a string of text and/or its constituent tokens, such as formatting characteristics, source characteristics, use characteristics, and/or grammatical characteristics (e.g., syntactic and/or semantic). In some implementations parser 110 may additionally and/or alternatively include an entity tagger configured to annotate entity references in one or more segments such as references to people, organizations, locations, and so forth.

In some implementations, parser 110 may identify a string from a webpage or other resource. Additionally or alternatively, parser 110 may identify formatting of the string and/or one or more of the tokens in the resource (e.g., one or more terms appear in the resource with a bold format) and annotate the strings and/or text with indications of such formatting and/or with information identified from HTML or XML tags associated with the string, and annotate the strings and/or text with such information. Also, for example, a string of text may be identified from a resource and the string of text may be annotated with a domain name, author, category, and/or other information associated with the resource. For instance, for a string of text extracted from a webpage that hosts a news story, the string of text may be annotated with domain name of the webpage and a "news" category.

In some implementations, a characteristic of a string may be an objective for the string. For example, a string may be associated with an objective of "limit to 64 characters." In some implementations, the objective of a string may be determined based on a use that is associated with the string. For example, strings with a "news headline" use may be associated with an objective of "limit to five words." In some implementations, a characteristic of a string may be determined based at least in part on the source of the string. For example, a string may be identified as a headline in a webpage from a news source, and a use of "news headline" may be determined for the string based on identifying a rule that indicates webpages associated with a news source likely include strings that are headlines.

At step 505, a set of one or more rewrite rules is identified. The set may be identified by a component that shares one or more characteristics with rewrite engine 115. Rewrite rules are rules that manipulate tokens of a string. Rewrite rules may, for example, add tokens to a string, remove tokens from a string, and/or change existing tokens of a string. Rewrite rules include, for example, replacing tokens with synonyms, removing delineating terms, and/or splitting a string that includes a conjunction into two or more strings.

In some implementations, a set of rewrite rules includes only a single rewrite rule. For example, a set may include Rule 1 and no other rules. In some implementations, a set may include a plurality of rewrite rules. For example, a set of rewrite rules may include Rule 1 and Rule 2; and rewrites may be generated by applying Rule 1 to a string and applying Rule 2 to the resulting string, with the second resulting string as the rewrite. In some implementations, a set of rewrite rules may be associated with one or more scores that indicate previously measured effectiveness of the set of rewrite rules on strings with one or more characteristics (e.g., based on user interactions with rewrites generated based on the set and/or based on previous effectiveness scores for rewrites generated based on the set). In some implementations, the characteristics-specific scores may be utilized to identify the set of rewrite rules. For example, parser 110 may identify that a string has a characteristic of "advertisement" and rewrite engine 115 may identify a set of rewrite rules with a score that is indicative of being effective on strings that are advertisements.

At step 510, rewrite engine 115 generates a rewrite for the tokenized string. As previously described, generating a rewrite includes manipulating one or more of the tokens of the string based on one or more rewrite rules.

At step 515, the rewrite is provided to one or more users. In some implementations, the rewrite may be provided to one or more users via a component that shares one or more characteristics with client device 105. In some implementations, the rewrite may be provided via browser 106. For example, the rewrite may be provided as anchor text on a webpage that a user may access via browser 106.

At step 520, one or more interactions of the user with the rewrite are identified. In some implementations, indications of the interactions may be provided by client device 105 to a component that shares one or more characteristics with scoring engine 120. In some implementations, interactions of users with the rewrite may be determined based on one or more users selecting and/or otherwise indicating an interest in the rewritten string. For example, a user interaction may be a user selecting a link that includes the rewrite as anchor text and/or moving a mouse icon over the rewrite on a webpage. In some implementations, a user interaction may be a user accessing content associated with the rewrite. For example, a user interaction may be a user clicking on a link that includes the rewrite as anchor text and accessing a webpage associated with the rewrite. The user interaction may be determined based on, for example, the length of time that the user accessed the associated webpage.

At step 525, the set of rewrite rules is scored based on the user interactions. In some implementations, the score may be determined based on identifying a count of users that interacted with the rewrite (e.g., a count of users that accessed a webpage associated with the rewrite). In some implementations, a score may be determined based on a count of users that interacted with the rewrite as compared to a count of total users that were provided the rewrite. The score may be determined by a component that shares one or more characteristics with scoring engine 120, as described herein.

Figure 6:
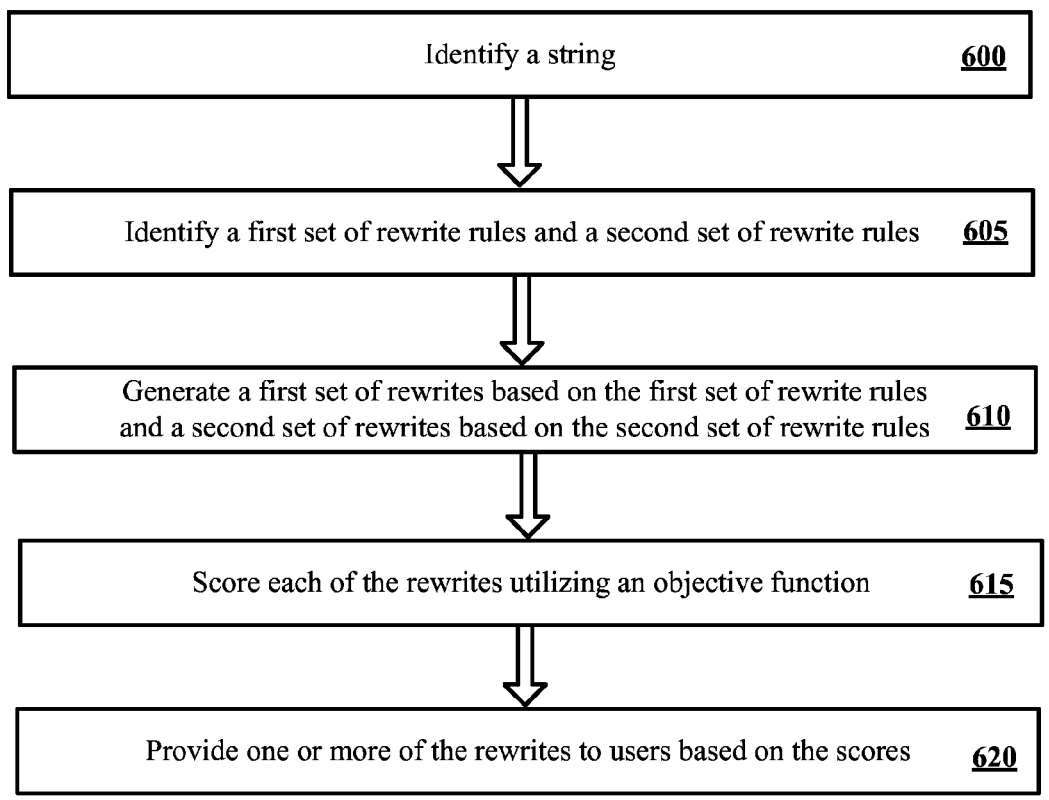
FIG. 6 is a flowchart illustrating an example method of determining effectiveness scores for rewrites of a string generated from multiple sets of rewrite rules.

Referring to FIG. 6, a flowchart illustrating an example method of determining effectiveness scores for rewrites of a string generated from multiple sets of rewrite rules is provided. Other implementations may perform the steps in a different order, omit certain steps, and/or perform different and/or additional steps than those illustrated in FIG. 6. For convenience, aspects of FIG. 6 will be described with reference to one or more components of FIG. 1 that may perform the method, such as rewrite engine 115 and/or scoring engine 120.

At step 600, a set of one or more rewrite rules is identified. The set may be identified by a component that shares one or more characteristics with parser 110. The step of identifying one or more string may share one or more aspects with step 500 of FIG. 5. For example, a string may be identified from one or more documents, may be identified based on one or more characteristics of the string, and/or may be provided to parser 110 by one or more applications. In some implementations, the provided string may be a tokenized string and/or may have one or more tags associated with the string and/or tokens, as described herein.

At step 605, a first set of rewrite rules and a second set of rewrite rules are identified. The identification of the first set of rewrite rules and the identification of the second set of rewrite rules may share one or more aspects with step 505 of FIG. 5. For example, the sets of rewrite rules may be identified based on one or more scores associated with the set of rewrite rules and/or based on one or more characteristics of the string and one or more characteristics that are associated with each of the identified sets of rewrite rules. The criteria for identifying each of the sets of rewrite rules need not be the same. For example, the first set of rewrite rules may be identified based on a first characteristic of the string and the second set of rewrite rules may be identified based on a second characteristic of the string.

At step 610, rewrites are generated based on the first set of rewrite rules and the second set of rewrite rules. The step of generating the rewrites based on rewrite rules may share one or more aspects with step 510 of FIG. 5.

At step 615, an effectiveness score is determined for each of the rewrites based on one or more objective functions. Each objective function measures one or more aspects of the rewrites and may be utilized to determine if a particular objective has been satisfied and/or the extent to which an objective has been satisfied. For example, the string may be associated with an objective to limit the string to 64 characters. An objective function that counts characters for strings may be utilized to determine the length of each rewrite and an effectiveness score determined based on the objective function. For example, if the count of characters of a rewrite is less than or equal to 64 characters, the effectiveness score will be more indicative of effectiveness than if the count of characters for that rewrite was greater than 64 characters. In some implementations, scoring of the rewrites may be further based on a score associated with the set of rewrite rules utilized to determine the rewrites. For example, a score may have been previously determined for the first set of rewrite rules and for the second set of rewrite rules as described with respect to the method of FIG. 5. The resulting scores may be utilized to determine an effectiveness score for the rewrites based on the score of the respective set of rewrite rules that generated the rewrites.

At step 620, one or more of the rewrites are provided based on the scores. For example, the highest scoring rewrite may be provided. Also, for example, rewrites with a score above a threshold score may be provided. In some implementations, one or more of the rewrites may be provided for user interaction, as described in FIG. 5. and a score may be determined that is indicative of user interaction with the provided rewrites.

Figure 7:
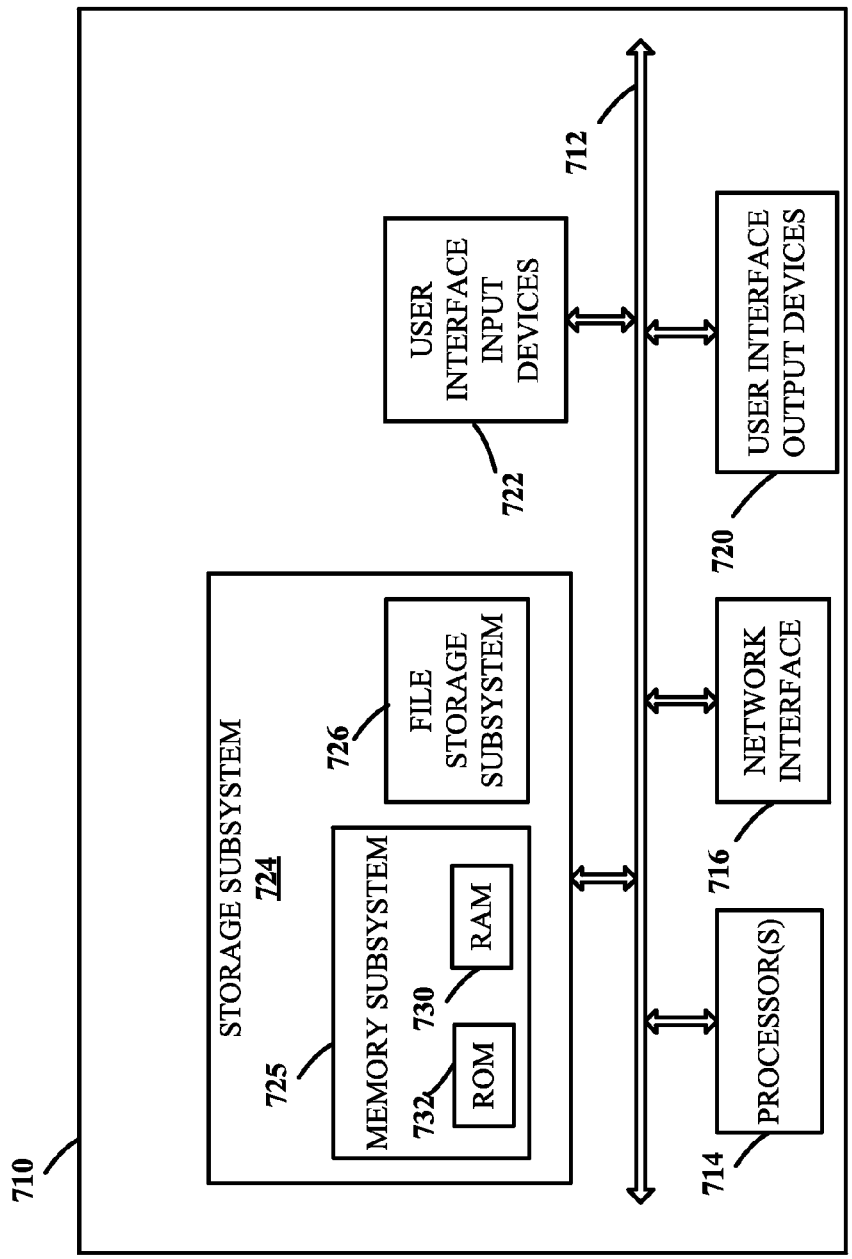
FIG. 7 illustrates a block diagram of an example computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to rewrite a string of text utilizing one or more rewrite rules. As another example, the storage subsystem 724 may include the logic to determine a score for a set of rewrite rules based on interactions of one or more users with rewrites generated utilizing the set of rewrite rules.

These software modules are generally executed by processor 714 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be optionally stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   identifying a string of text from a first electronic resource, wherein the string includes one or more tokens;
   identifying one or more rewrite rules;
   identifying a set of the rewrite rules for the string;
   generating a rewrite of the string based on the tokens and the set of the rewrite rules;
   providing, via one or more networks, the rewrite to computing devices, the rewrite being provided to the computing devices for presentation, via applications executing on the computing devices, of the rewrite to users of the computing devices, and the rewrite being provided for potential interaction, by the users via the applications, with content associated with the rewrite;

identifying one or more interactions with the rewrite, of the string from the first electronic resource, in response to the providing,
wherein each of the interactions indicates user interest in the content associated with the rewrite, and wherein each of the interactions are identified in response to corresponding user interface input provided via a corresponding one of the applications;

scoring the set of the rewrite rules based on the one or more interactions with the rewrite of the string from the first electronic resource;

after the scoring of the set of the rewrite rules, identifying an additional string of text from an additional electronic resource;

based on the scoring of the set of the rewrite rules, that is based on the one or more interactions with the rewrite of the string from the first electronic resource, selecting the set of the rewrite rules for generating an additional string rewrite of the additional string that is from the additional electronic resource, the selecting comprising selecting the set of the rewrite rules in lieu of other sets of the rewrite rules;

generating the additional string rewrite of the additional string, that is from the additional electronic resource, based on the set of the rewrite rules; and providing the additional string rewrite to one or more additional computing devices for presentation of the additional string rewrite to additional users of the additional computing devices.

2. The method of claim 1, further comprising:
identifying a second set of the rewrite rules for the string;
generating a second rewrite of the string based on the tokens and the second set of the rewrite rules;
identifying one or more second interactions with the second rewrite in response to providing the second rewrite for potential interaction with content associated with the second rewrite, wherein each of the second interactions indicates user interest in the content associated with the second rewrite; and
scoring the second set of the rewrite rules based on the one or more second interactions.

3. The method of claim 2, wherein the second set of the rewrite rules includes the rewrite rules of the set of rewrite rules and at least one additional rewrite rule of the rewrite rules.

4. The method of claim 1, further comprising:
determining one or more string characteristics for the string;
wherein scoring the set of the rewrite rules based on the one or more interactions comprises scoring the set of rewrite rules for the one or more string characteristics.

5. The method of claim 1, further comprising:
identifying interactions with the string, wherein each of the interactions with the string indicates user interest in content associated with the string, wherein scoring the set of the rewrite rules is further based on the interactions with the string.

6. The method of claim 1, further comprising:
identifying a second string of text from a second electronic resource, wherein the second string includes one or more second string tokens;
generating a second rewrite of the second string based on the tokens and the set of the rewrite rules;
identifying one or more second interactions with the second rewrite in response to providing the second rewrite for potential computer-based interaction with content associated with the second rewrite, wherein each of the second interactions indicates user interest in the content associated with the second rewrite; and
wherein scoring the set of rewrite rules is further based on the one or more second string interactions.

7. The method of claim 1, wherein scoring the set of the rewrite rules based on the one or more interactions comprises scoring the set of rewrite rules based on comparison of a quantity of the one or more interactions to a quantity of non-interactions of users with the rewrite in response to the providing, wherein each of the non-interactions indicates lack of user interest in the content associated with the rewrite.

8. The method of claim 1, wherein identifying the set of the rewrite rules comprises:
selecting the rewrite rules for inclusion in the set based on the rewrite rules preserving sentiment between the string and the rewrite.

9. The method of claim 1, wherein identifying the set of the rewrite rules comprises:
selecting the rewrite rules for inclusion in the set based on the rewrite rules minimizing information loss between the string and the rewrite.

10. The method of claim 1, wherein identifying the set of the rewrite rules comprises:
selecting the rewrite rules for inclusion in the set based on the rewrite rules minimizing the length of the rewrite.

11. The method of claim 1, wherein identifying the set of the rewrite rules includes identifying an order of application of the one or more rewrite rules for the set.

12. The method of claim 11, wherein the set of the rewrite rules includes a first rewrite rule of the rewrite rules and a second rewrite rule of the rewrite rules, wherein the order of application indicates application of the first rewrite rule before application of the second rewrite rule, and wherein generating the rewrite includes:
generating an intermediate rewrite of the string based on the tokens and the first rewrite rule; and
generating the rewrite of the string based on the intermediate rewrite of the string and the second rewrite rule.

13. The method of claim 1, wherein at least one of the rewrite rules of the set rearranges two or more of the tokens of the string.

14. The method of claim 1, wherein generating the rewrite of the string based on the tokens and the set of the rewrite rules includes:
identifying a set of the tokens that belong to a subtree of the string; and
wherein generating the rewrite is based on the subtree and the set of rewrite rules.

15. The method of claim 1, wherein generating the rewrite includes:
generating an intermediate rewrite of the string based on a given rewrite rule of the rewrite rules; and
generating the rewrite of the string based on the intermediate rewrite of the string and a second application of the given rewrite rule.

16. The method of claim 1, further comprising:
determining one or more string characteristics for the string;
wherein scoring the set of the rewrite rules based on the one or more interactions comprises scoring the set of the rewrite rules for the one or more string characteristics; and
wherein selecting the set of the rewrite rules for generating the second string rewrite of the rewrite rules is further based on the scoring being for the one or more string characteristics and the second string having the one or more string characteristics.

17. The method of claim 16, wherein the string characteristics include a use characteristic, the use characteristic being one of an anchor text use and an advertisement use.

18. A computer-implemented method, comprising:
generating a first score for a first set of rewrite rules, generating the first score comprising:
rewriting multiple first strings of text based on the first set of rewrite rules,
transmitting the rewrites of the multiple first strings of text over one or more networks,
and generating the score based on user interactions with the transmitted rewrites of the multiple first strings of text;
generating a second score for a second set of rewrite rules, generating the second score comprising:
rewriting multiple second strings of text based on the second set of rewrite rules,
transmitting the rewrites of the multiple second strings of text over one or more of the networks,
and generating the second score based on second user interactions with the transmitted rewrites of the multiple second strings of text;
identifying a future string of text from a given electronic resource, the given electronic resource being in addition to electronic resources that include the multiple first strings of text and the multiple second strings of text;
selecting, for the future string of text from the given electronic resource, the first set of rewrite rules and the second set of rewrite rules based on:
the first score for the first set of rewrite rules that is based on the first user interactions with the transmitted rewrites of the multiple first strings of text, and
the second score for the set of rewrite rules that is based on the second user interactions with the transmitted rewrites of the multiple second strings of text,
wherein the selecting comprises selecting the first set of rewrite rules and the second set of rewrite rules in lieu of other sets of the rewrite rules;
generating one or more first rewrites of the future string of text based on the first set of rewrite rules and the future string of text;
generating one or more second rewrites of the future string of text based on the second set of rewrite rules and the future string of text;
determining effectiveness scores for each of the first rewrites and the second rewrites based on one or more objective functions;
selecting a subset of the first and second rewrites based on the effectiveness scores; and
providing the subset to one or more computing devices.

19. The method of claim 18, wherein the first set of rewrite rules includes at least a first rewrite rule and a second rewrite rule, and wherein generating the first rewrites comprises:
generating an intermediate rewrite by applying first rewrite rule; and
generating a final rewrite of the first rewrites based on applying the second rewrite rule to the intermediate rewrite.

20. The method of claim 18, wherein first set of rewrite rules includes at least a first rewrite rule and the second set of rewrite rules includes the first set of rewrite rules and at least one additional rewrite rule, and wherein generating the one or more second rewrites is based on the one or more first rewrites.

21. The method of claim 20, wherein selecting the subset includes selecting one or more of the first rewrite rules if none of the effectiveness scores of the second set of rewrites satisfies a threshold value.

22. The method of claim 18, wherein determining the effectiveness scores for each of the first rewrites and the second rewrites based on one or more objective functions comprises:
determining the effectiveness scores for each of the first rewrites based in part on one or more scores associated with the first set of rewrite rules; and
determining the effectiveness scores for each of the second rewrites based in part on one or more scores associated with the second set of rewrite rules.

23. The method of claim 18, wherein the second set of rewrite rules includes the rewrite rules of the first set of rewrite rules and one or more additional rewrite rules.

24. The method of claim 18, wherein the first set of the rewrite rules and the second set of the rewrite rules include a first rewrite rule and a second rewrite rule;
wherein the order of application of the first set of rewrite rules indicates application of the first rewrite rule before application of the second rewrite rule, and wherein the order of application of the second set of rewrite rules indicates application of the second rewrite rule before the first rewrite rule.

25. A system, comprising:
memory storing instructions;
one or more processors operable to execute the instructions in the memory, wherein the instructions comprise instructions to:
identify a string of text from a first electronic resource, wherein the string includes one or more tokens;
identify one or more rewrite rules;
identify a set of the rewrite rules for the string;
generate a rewrite of the string based on the tokens and the set of the rewrite rules;
provide, via one or more networks, the rewrite to computing devices, the rewrite being provided to the computing devices for presentation, via applications executing on the computing devices, of the rewrite to users of the computing devices, and the rewrite being provided for potential interaction, by the users via the applications, with content associated with the rewrite;
identify one or more interactions with the rewrite, of the string from the first electronic resource, in response to the providing,
wherein each of the interactions indicates user interest in the content associated with the rewrite, and wherein each of the interactions are identified in response to corresponding user interface input provided via a corresponding one of the applications;
score the set of the rewrite rules based on the one or more interactions with the rewrite of the string from the first electronic resource;
after the scoring of the set of the rewrite rules, identify an additional string of text from an additional electronic resource;
based on the scoring of the set of the rewrite rules, that is based on the one or more interactions with the rewrite of the string from the first electronic resource, select the set of the rewrite rules for generating an additional string rewrite of the additional string that is from the additional electronic resource, the selecting comprising selecting the set of the rewrite rules in lieu of other sets of the rewrite rules;

generate the additional string rewrite of the additional string, that is from the additional electronic resource, based on the set of the rewrite rules; and provide the additional string rewrite to one or more additional computing devices for presentation of the additional string rewrite to additional users of the additional computing devices.

* * * * *